US012205435B2

(12) United States Patent
Larson et al.

(10) Patent No.: US 12,205,435 B2
(45) **Date of Patent: *Jan. 21, 2025**

(54) METHOD AND SYSTEM FOR CONDUCTING CONCURRENT GAMES

(71) Applicant: Castle Island IP Holding LLC, Charlottesville, VA (US)

(72) Inventors: Joshua Paul Larson, Zeeland, MI (US); Alan Roireau, Charlottesville, VA (US); Andrew Scheiner, Crozet, VA (US)

(73) Assignee: CASTLE ISLAND IP HOLDING LLC, Charlottesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,607

(22) Filed: Oct. 17, 2023

(65) Prior Publication Data

US 2024/0046741 A1 Feb. 8, 2024

Related U.S. Application Data

(63) Continuation of application No. 17/697,331, filed on Mar. 17, 2022, now Pat. No. 11,823,527, which is a continuation of application No. 17/323,897, filed on May 18, 2021, now Pat. No. 11,308,755.

(60) Provisional application No. 63/026,413, filed on May 18, 2020.

(51) Int. Cl.
*G07F 17/32* (2006.01)
*A63F 3/06* (2006.01)

(52) U.S. Cl.
CPC ........ *G07F 17/3225* (2013.01); *A63F 3/0645* (2013.01)

(58) Field of Classification Search
CPC ..... G07F 17/3225; G07F 17/32; A63F 3/0645
USPC ........................................................ 463/42
See application file for complete search history.

(56) References Cited

U.S. PATENT DOCUMENTS

| | | | |
|---|---|---|---|
| 5,647,798 A | 7/1997 | Falciglia | |
| 6,780,108 B1 | 8/2004 | Luciano, Jr. et al. | |
| 7,753,774 B2 | 7/2010 | Gail et al. | |
| 7,794,319 B2 | 9/2010 | Luciano, Jr. et al. | |
| 8,087,990 B2 | 1/2012 | Lind et al. | |
| 8,201,827 B2 | 6/2012 | Weingardt | |
| 8,419,522 B2 | 4/2013 | Lind et al. | |
| 8,585,502 B2 | 11/2013 | Shepherd | |
| 8,795,061 B2 * | 8/2014 | Burrill | G07F 17/32 463/40 |
| 9,275,522 B2 | 3/2016 | Chang et al. | |
| 9,349,244 B2 | 5/2016 | Weingardt et al. | |
| 9,600,962 B2 | 3/2017 | Weingardt et al. | |
| 10,229,560 B2 | 3/2019 | Weingardt et al. | |

(Continued)

*Primary Examiner* — Pierre E Elisca
(74) *Attorney, Agent, or Firm* — Workman Nydegger

(57) ABSTRACT

An improved gaming system and method enabling the creation and management of multiple concurrent games with limited numbers of players and/or gameplay stations. The gaming system includes at least a gaming server and a plurality of gameplay stations, the gaming server aggregating players and creating games in response to receiving a gameplay request and evaluating whether or not to begin a new game based on conditions of the gaming system, including a maximum number of allowed games, a failure rate of gameplay requests, a usage ratio and a number of gameplay stations currently participating in active games.

20 Claims, 5 Drawing Sheets

(56) References Cited

U.S. PATENT DOCUMENTS

| | | | | |
|---|---|---|---|---|
| 10,930,121 | B2 * | 2/2021 | Moore ................ | G07F 17/3225 |
| 2004/0242310 | A1 | 12/2004 | Perkins | |
| 2006/0160624 | A1 * | 7/2006 | Slomiany ................ | G07F 17/32 463/42 |
| 2007/0233585 | A1 * | 10/2007 | Ben Simon ......... | G07F 17/3244 705/35 |
| 2008/0076506 | A1 * | 3/2008 | Nguyen ................ | G07F 17/322 463/16 |
| 2009/0062008 | A1 * | 3/2009 | Karmarkar .......... | G07F 17/3218 463/25 |
| 2012/0149456 | A1 * | 6/2012 | Acres .................. | G07F 17/3218 463/31 |
| 2015/0072776 | A1 * | 3/2015 | Nicely .................... | G07F 17/34 463/29 |
| 2015/0072783 | A1 * | 3/2015 | Nicely .................. | G07F 17/326 463/31 |
| 2015/0294528 | A1 | 10/2015 | Young et al. | |
| 2016/0351017 | A1 * | 12/2016 | Moore ................ | G07F 17/3293 |

* cited by examiner

METHOD AND SYSTEM FOR CONDUCTING CONCURRENT GAMES

CROSS REFERENCE TO RELATED APPLICATIONS

This application is a continuation of U.S. application Ser. No. 17/697,331, filed Mar. 17, 2022, which is a continuation of U.S. application Ser. No. 17/323,897, filed May 18, 2021, now U.S. Pat. No. 11,308,755, which claims the benefit of U.S. provisional application No. 63/026,413 filed May 18, 2020. The noted priority applications are incorporated herein by reference in their entirety.

FIELD OF THE DISCLOSURE

The field of the disclosure relates generally to gameplay stations and gaming servers, including gaming consoles, gaming machines or networked gaming machines, such as gameplay stations and gaming servers found in casinos or betting environments, and related methods of operation. More particularly, the disclosure is directed to methods and devices for improving the rapid creation of bingo games in areas that are occasionally subject to periods of low player participation.

BACKGROUND

Gaming in the United States is generally categorized into class I, class II and class III for the purposes of regulation, with class I gaming being defined as traditional tribal gaming subject to the least regulation, and class III gaming being subject to the greatest regulation and broadly encompassing all forms of gaming that are neither class I or II.

Class II gaming includes the game commonly referred to as bingo, whether or not electronic, computer, or other technological aids are used in connection with the game. In traditional bingo, players purchase cards that include different arrangements of tokens, such as numbers or other symbols, in a grid or other pattern. A caller randomly selects tokens from a token pool and players match the called tokens to their cards. When the matched tokens on a player's card form certain predetermined patterns or arrangements, such as a line, only corners, a completely filled card or other arrangement, the card may be identified as a winning card and scored accordingly, such that a corresponding reward or prize may be disbursed. A number of winning arrangements may be possible, such that a winning card may or may not conclude the game.

The distinction of bingo as class II gaming has two primary implications in the gaming industry. First, class II gaming presents the advantage of less restrictive regulation relative to class III (e.g., slot machines, blackjack, craps, roulette, etc.), allowing for broader accessibility or distribution of related gaming systems. Second, while historically popular on its own merit, the expansion of class II gaming, or more specifically bingo, is hampered due to the restrictive definition of class II gaming limiting innovation in gameplay relative to class III gaming. For example, while class III gaming allows for variations in gameplay, odds, and associated gaming strategies, class II gaming is required to be based on a bingo game and requires a representation of the traditional bingo game including multiple players, a card and a call, even if only underlying the game.

As the gaming industry has modernized, various systems have been developed to enhance player participation in bingo. In particular, class II slot machines have been developed allowing for digital automation of the card purchase, caller, matching, and scoring aspects of bingo games. Class II slot machines provide one example of machines or systems that incorporate a bingo gaming arrangement into software for controlling other popular gaming schemes. These systems increase the speed of gameplay and allow the incorporation of additional entertainment features, such as entertaining displays, sounds, etc., enhancing the player experience and increasing participation in the game while retaining the advantages of access to the more widespread class II permissive jurisdictions.

Some existing class II slot machines are in many ways indistinguishable from commonly known slot machines used in class III casinos except, instead of using an algorithm or random generator for determining a winning spin, the result of the spinning reels is determined by the outcome of an underlying bingo game conducted in the background. These class II slot machines provide a player with the speed and entertainment value of traditional slot machines and other popular wager games, by taking advantage of the class II definition being inclusive of electronic, computer, or other technological aids used in connection with a bingo game. The addition of such electronic, computer, or other technological aids allows for games having the appearance and gameplay advantages of class III, casino-style games, while being permitted in jurisdictions limiting permitted gaming to class II.

Unfortunately, despite the modernization of several aspects of class II gaming, further expansion of class II gaming is limited by regulatory constraints based on traditional aspects of bingo. For example, while a player operating a slot machine is generally able to play without the need for other players, class II gaming regulations often require a predetermined number of people to initiate a bingo game. If there is an insufficient number of players attempting to play at one time, class II gaming regulations prohibit the start of a new game, leaving players without an opportunity to play at all or with long wait times. As such, access to class II gaming outside of larger gaming establishments is currently limited.

Prior art solutions to the constraint of low player numbers have focused on increasing the number of participants by connecting higher numbers of class II gameplay stations over large geographic areas using internet or other third-party data connections. These prior art solutions increase the probability of successfully matching enough players from a queue to begin a bingo game by increasing the number of connected gameplay stations, but are subject to increased costs and complications due to the need to connect gameplay stations and gaming servers separated by large distances. The addition of suitable internet or data connections to the gameplay stations, and particularly to the potentially remote locations housing them, increases the costs and complexity of manufacture, installation, maintenance and security of these gaming systems.

Unfortunately, these increased costs have limited access to class II gaming, particularly in the case of class II slot machines or similar electronic implementations of a bingo game, for prospective players that are not able to conveniently access larger gaming establishments or casual players that prefer a different gaming environment.

In view of the foregoing, there is a need for an improved gaming system and method that improves availability of games without requiring an increase in the number of interconnected gameplay stations. A need exists for a gaming system and method that can be adapted to more remote locations and that can facilitate the creation of new games without requiring long delays in gameplay.

There is further a need for a gaming system that is capable of managing the creation and gameplay of multiple games, without increasing the processing requirements of a gaming server or gameplay station.

SUMMARY

The embodiments disclosed herein are directed to providing an improved gaming system and method that addresses the problems above and enables the advantage of creating and managing multiple concurrent games with limited numbers of players and/or gameplay stations. The embodiments may be employed to facilitate class II gaming, including bingo games, or adapted to other game types where the resulting advantages would be beneficial.

According to a first aspect of the disclosed embodiments there is provided a method for aggregating players and creating games in a gaming system, the method including using a gaming server to receive a gameplay request from one of a plurality of gameplay stations. Upon receipt of the gameplay request, and each subsequent request, the gaming server evaluates whether or not to begin a new game based on conditions of the gaming system. The determination of whether or not to begin a new game may be made in a number of different ways but is based on conditions of the gaming system, rather than only on the size of a queue as in prior art systems, advantageously maximizing the creation of new games in the gaming system without requiring larger numbers of players for continued operation. The maintenance of a higher number of active games in the gaming system relative to the size of a player pool reduces the processing requirements of the gaming system, increases the speed of the gaming system and gameplay while reducing the complexity of the system, such that each gameplay request may be processed individually in a more rapid manner. Accordingly, the improved gaming system and method of the of the current disclosure address specific, longstanding problems in the technical field of virtual class II gaming.

In evaluating whether or not to begin a new game according to one embodiment, the gaming server may identify a number of active games pending at the gaming server and determine if the number of active games pending at the gaming server meets a predefined condition for a maximum number of active games. Where the number of active games pending at the gaming server meets the predefined condition for the maximum number of games, the gaming server may determine not to begin a new game and direct that the gameplay request be added to one of the existing games such that the gameplay station corresponding to the gameplay request is connected to an active game and enables a player to participate in the game.

In the alternative case, should the number of active games pending at the gaming server fail to meet the predefined condition for the maximum number of games, the gaming server progresses towards the creation of a new game with the gameplay request. According to varying embodiments the predefined condition for the maximum number of games may be established to balance the creation of new games with the processing requirements of each active game, such as for realizing an advantageous speed of gaming.

In another aspect, the gaming server may identify a number of failed gameplay requests at the gaming server and determine whether the number of failed gameplay requests exceeds a predefined condition for a maximum failure rate. Should the number of failed gameplay requests exceed the predefined condition for the maximum failure rate, the gameplay request may then be added to one of the existing games.

The use of a predefined condition for a maximum failure rate may advantageously prevent problematic situations where an insufficient number of players is present, or inappropriately distributed within a plurality of games, to facilitate gameplay in existing games or in a new game. Accordingly, where the number of failed gameplay requests is below the predefined condition for the maximum failure rate such that gameplay is facilitated in existing games or in previously created new games, the gameplay request may progress towards the creation of a new game.

The gaming server may create a usage value based on a ratio of a number of the plurality of gameplay stations and the number of active games pending at the gaming server for determining whether or not to create a new game. The usage value may be compared by the gaming server to a first randomly selected control value, such that if the usage value is less than the first randomly selected control value the gameplay request is added to an existing game and if it is larger than the first randomly selected control value the gameplay request may progress towards the creation of a new game.

According to an embodiment, the gaming server may identify a number of the plurality of gameplay stations participating in active games pending at the gaming server, for determining whether the number of the plurality of gameplay stations participating in active games pending at the gaming server exceeds a second randomly selected control value. When the number of the plurality of gameplay stations participating in active games pending at the gaming server is less than the second randomly selected control value the gameplay request may be added to an existing game, and when it is larger the gaming server may progress towards the creation of a new game with the gameplay request.

In the evaluation of whether or not to begin a new game, the gaming server is configured to increase the number of active games pending at the gaming server relative to the number of players and/or gameplay stations, such that a maximum number of games is advantageously maintained at the gaming server even during periods of low player participation. As described above, the gaming server may evaluate a number of predefined conditions of the gaming system in determining whether to create a new game, such as upon receipt of each gameplay request, upon a periodic number of gameplay requests received, or based on a predetermined time interval. In a preferred embodiment, the gaming server may be configured to evaluate the number of predefined conditions of the gaming system in determining whether to create a new game upon receipt of each gameplay request individually, reducing the complexity of the system and making the gaming system faster, so as to reduce delays in gameplay for systems having variable player participation and particularly periods of very low participation, such as one active gameplay station.

At least by evaluating the conditions of the gaming system rather than the status of a queue, the gaming server of the current disclosure is able to ensure the creation and concurrent pendency of a greater number of games using a smaller player pool than is possible in the prior art, and at a faster rate. Rather than basing the creation of a new game on a total number of players waiting to play, the gaming server advantageously evaluates a gameplay request based on pending games in the gaming server, thereby reducing the complexity of game creation relative to known systems. An advantageous result of the new and unconventional embodiments of the current disclosure is that new games are created when a number of players is sufficient to allow the creation of new games, such that a sufficient number of games is maintained to allow gameplay when there are not enough players to create new games.

A gaming system according to an embodiment of the present disclosure may include a plurality of gameplay stations configured to communicate locally with a gaming server. The gameplay stations may include a display and a processor configured for operating a user interface, and a player may provide an input at the user interface, such as by initiating a gameplay request, that can be communicated over a local communication system to the gaming server. The gaming server may include a processor and a memory configured for performing the method of the current disclosure, such that the gaming server creates and manages a maximum number of games using the gameplay requests received from the gameplay stations.

In one embodiment, the local communications system connecting the gameplay stations and the gaming server may be a short-range wireless network or a wired connection, such that the gameplay stations and the gaming server are directly connected. In a specific embodiment, the local communications system connecting the gameplay stations and the gaming server may be a restricted or secure connection, such that the connection does not utilize an internet or other third-party data connection, but instead comprises a direct peer-to-peer communication. In related embodiments, the local communications system connecting the gameplay stations and the gameplay server may have a limited effective distance, such that the gaming server must be within 150 meters of the gameplay stations, more particularly 100 meters or 50 meters.

In one aspect, the number of gameplay stations in the gaming system may be limited. For example, the gaming system may include less than 800 gameplay stations, less than 500 gameplay stations, less than 200 gameplay stations, less than 20 gameplay stations, less than 10 gameplay stations or more particularly 6 gameplay stations or less.

The gaming server may be a bingo gaming server, such that the gaming server creates and manages a maximum number of bingo games using the gameplay requests received from the gameplay stations. In one aspect, each gameplay request provided at a gameplay station may comprise a card including a different arrangement of tokens, for example corresponding to a player's purchase of a card through the user interface. The card may include a random selection and arrangement of tokens from a token pool, and may be selected from a plurality of cards for assignment to the gameplay request or randomly generated for each gameplay request. Each active game on the gaming server may include a call, comprising randomly selected tokens from a token pool, such that the gaming server determines whether to compare the gameplay request or card of the player to an existing call or active game pending on the gaming server, or to create a new call to compare to the gameplay request. When the tokens on the player's card matching the call of the game form one of a plurality of certain predetermined patterns or arrangements, the card of the gameplay request is identified as a winner. Each winner may be scored against a predetermined score sheet and a corresponding reward may be disbursed to the player at the gameplay station.

In embodiments, an existing active game pending at the gaming server continues until a predetermined ending pattern occurs, the predetermined ending pattern corresponding to a game winner that concludes the game such that the gaming server discards the call of said game. In one embodiment the predetermined ending pattern may be selected for having a low likelihood of occurrence, such as a 1 in 20,000 chance of occurring, a 1 in 40,000 chance of occurring, or a 1 in 400,000 chance of occurring, in order to maximize the number of cards playable for each game.

Exemplary embodiments of the system and method for gaming enable a less complex, more easily controlled, and more entertaining experience for players by providing a greater number of active games at a gaming server relative to the size of the player pool. The problems of low player participation are mitigated by a gaming server creating new games based on the conditions of existing games at the gaming server, such that new games are created when possible and may essentially be stockpiled to accommodate periods of low player participation. Processing requirements for the gaming system are further reduced by removing the need to constantly evaluate a gameplay request queue and by considering each gameplay request individually, based on the local conditions of the gaming system.

The difficulties and costs associated with providing internet or third-party data connections for gaming servers and/or gameplay stations are additionally overcome by gaming systems of the present disclosure allowing increased operation in remote, isolated or controlled locations with smaller player pools relative to prior art systems.

These and other features of the disclosure will become better understood by reference to the following description, appended claims, and accompanying drawings.

Figure 1:
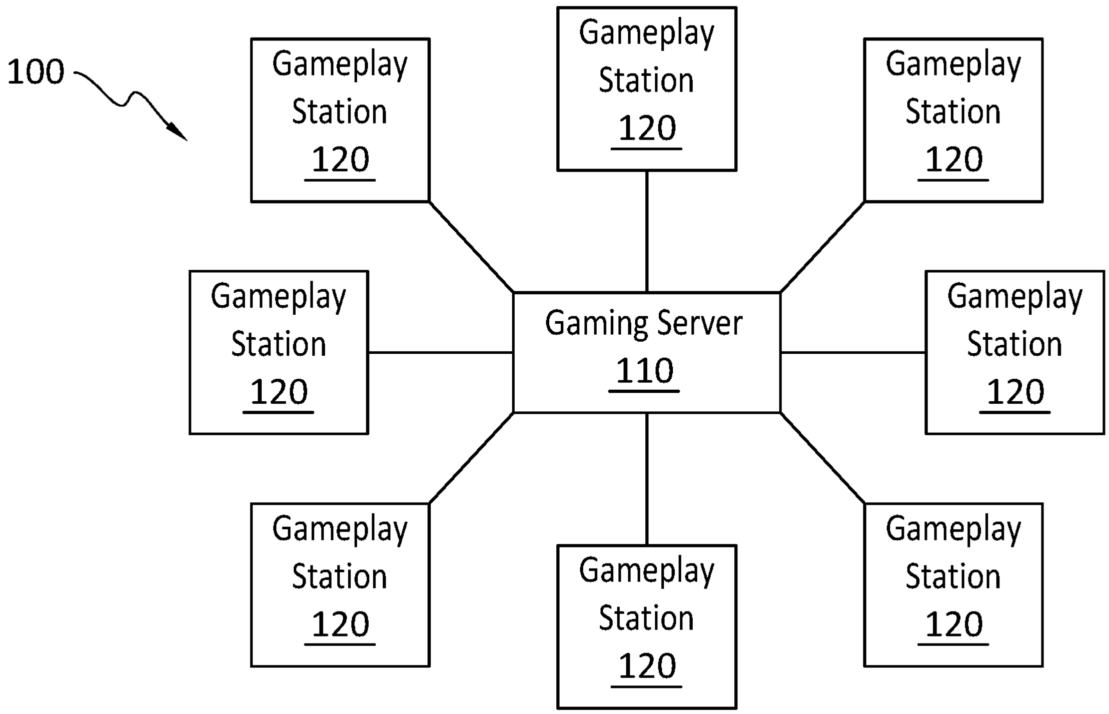
FIG. 1 is a diagrammatic view of a gaming system according to an embodiment of the disclosure.

The figures are not necessarily drawn to scale, but instead are drawn to provide a better understanding of the components, and are not intended to be limiting in scope, but to provide exemplary illustrations. The figures illustrate exemplary configurations of a system and method for gaming, and in no way limit the structures, configurations, or methods of the system and method for gaming according to the present disclosure.

DETAILED DESCRIPTION OF VARIOUS EMBODIMENTS

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. The dimensions, connections, and arrangements represented in the figures introduced above are to be understood as exemplary and are not necessarily shown in proportion. It should be understood, however, there is no intention to limit the disclosure to the specific embodiments disclosed, but on the contrary, the intention covers all modifications, alternative constructions, combinations, and equivalents falling within the spirit and scope of the disclosure.

The flowchart illustrations and block diagrams in the flow diagrams illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s).

It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart illustrations and/or block diagram block or blocks.

As used in the present disclosure, a "local connection" or "local communications interface" is generally used to refer to a direct connection by means of a network, whether wired or wireless, or similar means that does not require or otherwise involve the use of an internet or other third-party data connection.

Examples of the current disclosure may be provided in terms referring to a bingo game, however there is no intention to limit the disclosure thereto. Rather, one of ordinary skill in the art will recognize the possibility of applying the same principles of embodiments of the current disclosure to alternative forms of gaming.

As referenced in the examples of the current disclosure, a "game," "active game," "existing game," and/or "new game" may be used to refer to a bingo call or another set of parameters governing results of a wager. A player or gameplay request entering or being assigned to a game generally refers to applying the call associated with the game to a wager associated with the player or gameplay request. While the creation of a new game may require a predetermined number of concurrent players or gameplay requests, a game or an existing game may subsequently be maintained without any active gameplay requests for periods of time. In this state, an existing or active game may be considered empty until a gameplay request is assigned to the game. A game may end when the call is discarded by the server, such as due to a game ending result or due to manual operation by an administrator.

Embodiments of a gaming system and related methods are provided for increasing the availability of games in the gaming system relative to a number of players and/or gameplay stations provided in the gaming system, while reducing the processing requirements of the gaming system and delays in gameplay.

The embodiments of the gaming system and the related methods according to the present disclosure advantageously maximizes a number of active games at a gaming server by determining whether to create a new game from a gameplay request, based on a current condition of the gaming system. Maximizing the number of active games at the gaming server ensures that active games are present for a player to use and minimizes the time that players must wait for additional players prior to playing. Thus, the number of players and/or gameplay stations required for operating the gaming system is reduced, and locations suitable for providing a gaming system are increased without the associated costs and complexity of prior art systems that require networking over large distances.

FIG. 1 illustrates an embodiment of a gaming system 100 including a gaming server 110 in communication with a plurality of gameplay stations 120 for enabling players to participate in gaming. In one example, the gaming system 100 may include a smaller number of gameplay stations than is commonly provided in existing systems, such as less than 20 gameplay stations, less than 10 gameplay stations or more particularly 6 gameplay stations or less. The gaming system 100 may be configured to provide the gaming server 110 and the plurality of gameplay stations 120 in the same general location, such as in a single building or within a predetermined distance of less than 150 meters, less than 100 meters, less than 50 meters, or less than 30 meters, such that the costs and complexity of the gaming system 100 is reduced.

Figure 2:
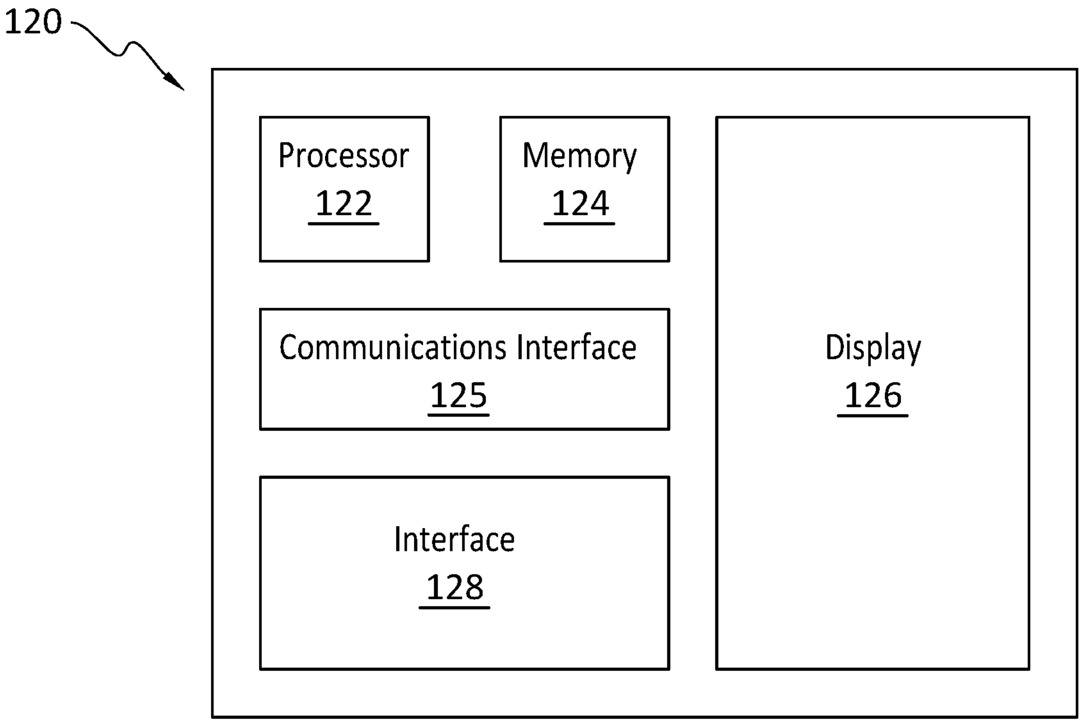
FIG. 2 is a diagrammatic view of a gameplay station according to an embodiment of the disclosure.

As illustrated in FIG. 2, each of the plurality of gameplay stations 120 may include a processor 122 and a memory 124 for operating a corresponding display 126 and a corresponding user interface 128. In operation, each gameplay station 120 is arranged to facilitate an input by a player, such that a corresponding gameplay request is sent by a communications interface 125 from the gameplay station 120 to the gaming server 110. As would be understood by one of ordinary skill in the art, the user interface 128 may include a keyboard, touch screen, card reader or other value receiving device, speakers, microphones, or other components as would be understood by one of ordinary skill in the art.

Figure 3:
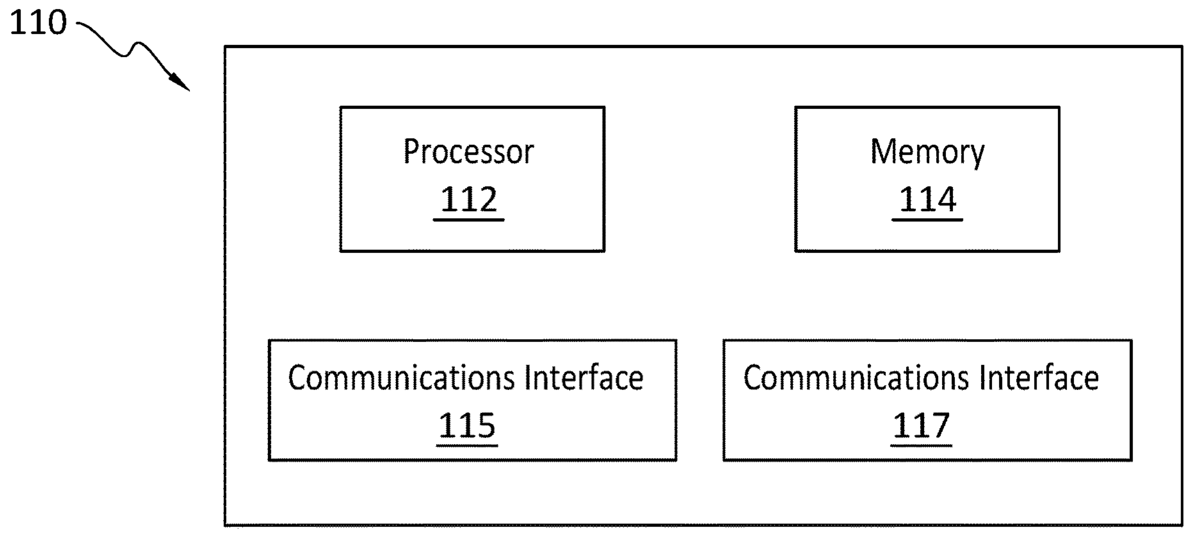
FIG. 3 is a diagrammatic view of a gaming server according to an embodiment of the disclosure.

An embodiment of a gaming server 110 is shown in FIG. 3, including a processor 112, a memory 114 and a communications interface 115, for conducting a plurality of concurrent games thereon. The gaming server 110 may be configured for receiving a gameplay request of a gameplay station 120 by means of the communications interface 115 and either adding the gameplay request to an existing game or creating a new game using the gameplay request, such as based on the conditions of the gaming system 100 according to the methods described below.

According to another aspect of the disclosure, the communications interface 115 of the gaming server 110 and/or the communications interface 125 of the gameplay stations 120 may facilitate only a local connection, or may be provided as local communications interfaces, such that the use of an internet connection, internet service provider (ISP) or other third-party data connection is not required for communications between the gaming server 110 and the plurality of gameplay stations 120. In one embodiment, the communications interfaces 115, 125 may be restricted to short distance communications. According to an embodiment, the gaming server 110 may be provided with a communications interface 117 for remote management, maintenance or monitoring of the gaming system. For example, communications interface 117 may include an internet connection or other third-party data connection, such as for processing payments made by a player or for other external communications as would be understood by one of ordinary skill in the art.

According to alternative embodiments, it is appreciated that the gameplay stations 120 and the gaming server 110 may be implemented in a single computing system, such that the gameplay stations 120 are integrated into a single device with or without the gaming server 110 also implemented thereon. In integrated embodiments, the gaming server 110 and the gameplay stations 120 may be operated using the same processor and/or the same memory with a plurality of user interfaces 128 and/or communications interfaces 115, 117, 125.

Gaming system 100 is arranged to maximize a number of active games pending at the gaming server 110 by determining whether to begin a new game at the gaming server 110 upon receipt of a gameplay request from a gameplay station 120 based on the condition of the gaming system 100. According to embodiments, the gaming server 110 is adapted to concurrently provide a number of active games while creating new games and does not determine whether to create a new game based on a size of a queue or a number of pending gameplay requests. Rather, the gaming server 110 may evaluate the occurrence of active games operating at the gaming server 110 based on predetermined conditions, and accordingly add a gameplay request to an existing game or create a new game with the gameplay request.

Figure 4:
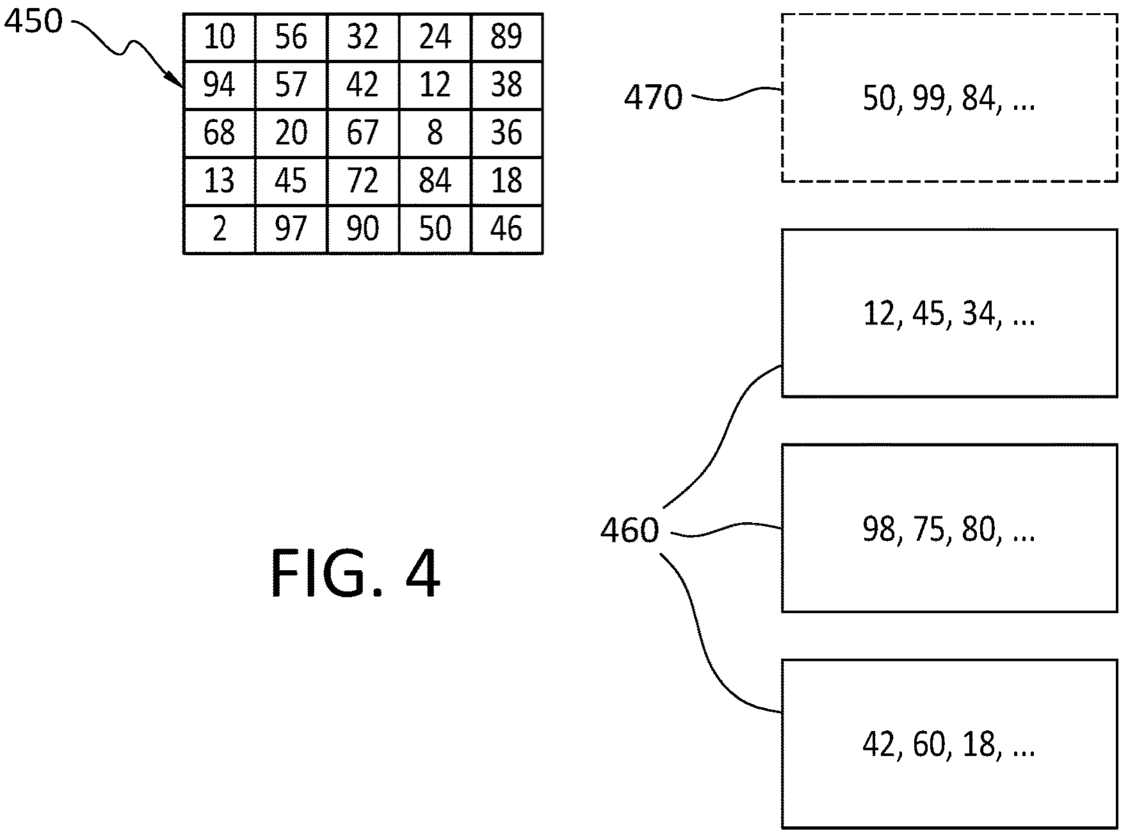
FIG. 4 is a diagrammatic view of a gameplay request received by a gaming server and games provided on the gaming server according to an embodiment of the disclosure.

Embodiments of the disclosure may be directed to games facilitated by underlying bingo games, as illustrated in FIG. 4. Accordingly, the gaming server 110 may comprise a bingo gaming server, such that the gaming server 110 creates and manages a maximum number of bingo games using gameplay requests received from the gameplay stations 120. Each gameplay request provided from a gameplay station 120 may include a card 450 including a different arrangement of tokens, for example corresponding to a player's purchase of a card through the user interface 128, and/or a wager amount. The card may include a random selection and arrangement of tokens from a token pool and may be selected from a plurality of cards for assignment to the gameplay request or randomly generated for each gameplay request. A card 450 may be attached to the gameplay request either before or after the gaming server determines whether to assign the gameplay request 450 to an existing call or active game 460 pending on the gaming server 110, or to create a new call or new game 470 to assign to the gameplay request 450.

Each active game 460 on the gaming server 110 may include a call, including randomly selected tokens from a token pool, such that the gaming server 110 determines whether to compare the gameplay request 450 or card of the player to an existing call or active game 460 pending on the gaming server 110, or to create a new call or new game 470 to compare to the gameplay request 450. When the tokens on the player's card matching the call of the game 460 form one of a plurality of certain predetermined patterns or arrangements, the card of the gameplay request 450 is identified as a winner and may be scored against a predetermined score sheet such that a corresponding reward may be disbursed to the player at the gameplay station 120. Alternatively, when the tokens on the player's card matching the call of the game 460 do not form one of the plurality of predetermined patterns or arrangements, the gameplay request 450 may be discarded and no reward provided.

In embodiments, following the determination of the gameplay request 450 as a winner or not, a player may initiate an additional gameplay request 450 to the gaming server 110. An existing active game 460 pending at the gaming server 110 may continue to receive and score further gameplay requests 450 and corresponding cards until a predetermined ending pattern occurs in a gameplay request 460, the predetermined ending pattern corresponding to a game winner that concludes the game such that the gaming server discards the call of said game from use. According to varying embodiments, the predetermined ending pattern may be selected for having a low likelihood of occurrence, such as a 1 in 1,000 chance of occurring, a 1 in 10,000 chance of occurring, a 1 in 20,000 chance of occurring, a 1 in 40,000 chance of occurring, a 1 in 100,000 chance of occurring, a 1 in 400,000 chance of occurring, or a less likely chance of occurring, in order to maximize the number of cards playable for each game. As would be understood from the above by one of ordinary skill in the art, the ending pattern may be selected to maximize the number of cards playable for each game while retaining a desired number of cards available for further gameplay requests and wagers in the game, to maintain a desired likelihood of rewards or odds for the game.

Figure 5:
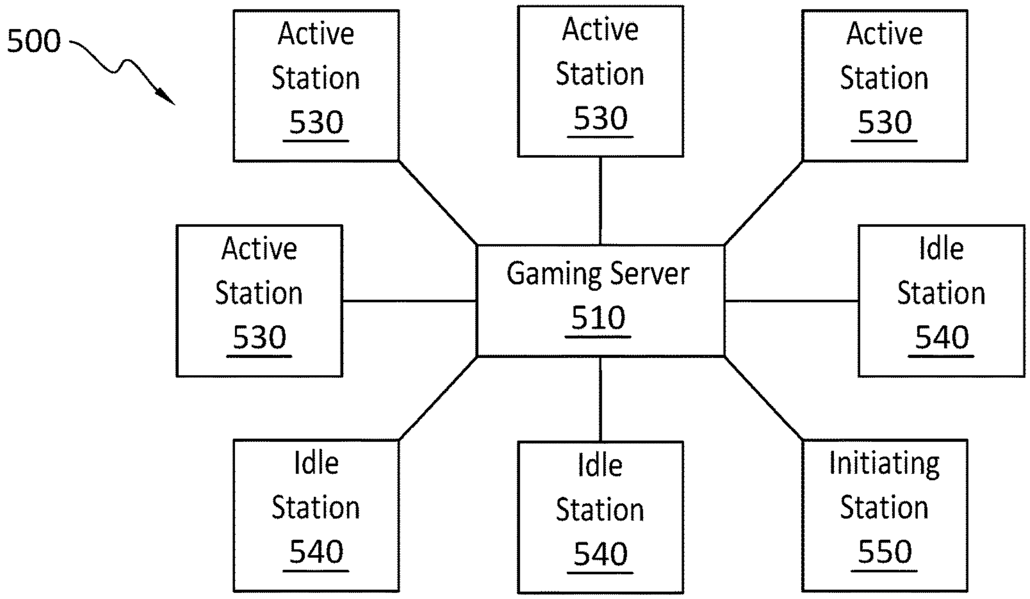
FIG. 5 is a diagrammatic view of a gaming system according to an embodiment of the disclosure in operation.

FIG. 5 illustrates an operating state of a gaming system 500, wherein a plurality of active gameplay stations are participating in active games pending at a gaming server 510 while a plurality of idle gameplay stations 540 remain open and awaiting players. An initiating gameplay station 550 is activated by a player input and communicates a corresponding gameplay request to the gaming server 510.

As discussed previously, gaming systems in the prior art are limited by regulatory requirements restricting the creation of new class II games to games meeting a quorum requirement, based on a number of players in the game. For example, in the prior art a gaming system according to FIG. 5 would be limited by the number of players participating at any one time, such that when an insufficient number of players for creating a new game is participating new players are unable to play. For addressing this problem, the prior art employs a queue and requires complex and costly connections between local gaming servers and remote gaming servers for connecting larger and larger numbers of gaming stations to increase the probability of a sufficient number of players being present in the queue for creating new games. The use of a queue according to the prior art also increases delays in processing a gameplay request, particularly during periods of low player participation, as a player is required to wait in the queue until a quorum is established in order to advance the gameplay request and receive a corresponding result or wager outcome.

In contrast to the prior art, the current disclosure has surprisingly shown the ability to overcome the problem of low player participation by a gaming server creating new games based on the conditions of existing games at the gaming server, such that new games are created when possible and essentially stockpiled to accommodate periods of low player participation. Accordingly, new players at an initiating gameplay station 550 are able to join an existing game or create a new game as circumstances permit, thus overcoming the difficulties and costs associated with providing internet or third-party data connections for gaming servers and/or gameplay stations and allowing increased operation in remote, isolated or controlled locations relative to prior art systems. Similarly, network monitoring requirements are reduced for a gaming facility or organization, such as a casino, due to a simplification and reduction in network traffic required for the gaming system. The maintenance of a higher number of active games in the gaming system relative to the size of a player pool further reduces the processing requirements of the gaming system and increases the speed of gameplay, such that each gameplay request may be processed individually in a more rapid manner.

Figure 6:
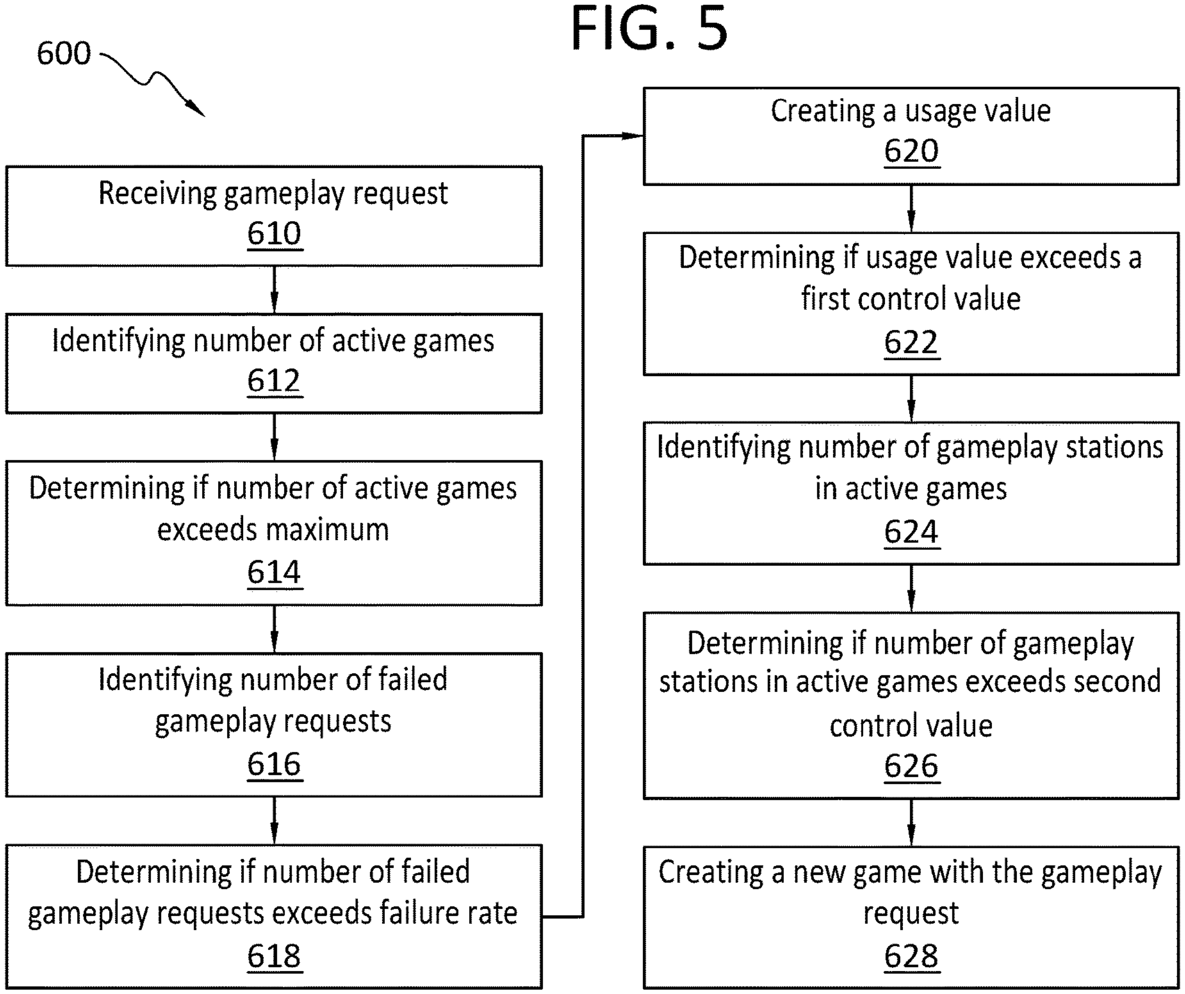
FIG. 6 is a flow diagram of a method for aggregating players and creating games according to an embodiment of the present disclosure.

FIG. 6 illustrates a process 600 that may be performed at a gaming server 110, 510 for determining whether to create a new game according to a method of the disclosure. After a gameplay station 120, 550 is activated and a corresponding gameplay request is communicated to the gaming server 110, 510, the gaming server receives the gameplay request 610. According to varying embodiments, the gameplay request received by the gaming server may include a corresponding card or may be assigned a card upon receipt at the gaming server. A card may include a random selection and arrangement of tokens from a token pool and may be selected from a plurality of cards for assignment to the gameplay request or randomly generated for each gameplay request. Accordingly, a gameplay request may include a single card or a plurality of cards for use in a bingo game, such that each gameplay request may correspond to a single wager or a plurality of wagers for evaluation in a game. In a preferred embodiment, the process for determining whether to create a new game is performed for each gameplay request.

In other embodiments, a gameplay request may provide an initial card or an initial batch of cards for use in a bingo game, and subsequent cards may be assigned or selected within the game until the predetermined ending pattern occurs to conclude the game. In this example, a gameplay request from a gameplay station may be assigned to a game, whether new or existing, and subsequent gameplay requests from said gameplay station may be automatically assigned to the same game until the game concludes, until the gameplay station remains inactive for a predetermined period of time, until the gameplay station submits a predetermined number of gameplay requests, or until another condition selected by an administrator occurs.

As would be understood by one of ordinary skill in the art, various forms of card assignment or selection are contemplated. The cards may take varying forms, including a random arrangement of any number of tokens, symbols, numbers or otherwise, such as in a grid pattern, a line or other arrangement. The card may be selected from a plurality of cards for assignment to the gameplay request or randomly generated for each gameplay request. For example, a card may have the form of a standard bingo card comprising numbers arranged in a 5-by-5 grid. While the card may or may not be presented to a player in the display 126 of the gameplay station 120, the underlying card may be represented in a gameplay request 450 communicated to or assigned by the gaming server 110 in a digital, numerical, referential or other form as would be understood by one of ordinary skill in the art.

In embodiments, the assignment or selection of a card may be limited to prevent the same card being used in the same game. For example, assignment or selection of a card may be restricted to only cards that have not yet been used in a game. In an alternative embodiment, assignment of a gameplay request to an existing game may be made by taking into account whether a card of the gameplay request has been used in said existing game previously, such that a card can be used only once for each game and associated call. Alternatively, where a card is randomly generated for each gameplay request, identical cards may occur.

In addition to the assignment or selection of a card, the gameplay request may include a wager amount as input by a player. In varying forms of the gaming system, the player may select a predefined wager or enter a custom wager using the user interface 128, for example by means of a card reader or other reader for receiving objects of value. The wager may accompany the gameplay request to the gaming server or be retained in the gameplay station, for communication or resolution after a result of a given card is determined.

Upon receipt of the gameplay request 610, and each subsequent request, the gaming server evaluates whether or not to begin a new game based on conditions of the gaming system. As previously described, regulatory constraints require a predetermined number of concurrent players or gameplay requests for beginning a new game. In one example, at least two concurrent players are required for starting a new game, however, the number of concurrent players required for starting a new game may be varied in response to regulation or other constraints.

In embodiments of the current disclosure, the determination of whether or not to create a new game 600 may be made in a number of different ways including varying steps, but is based on conditions of the gaming system rather than on the size of a queue of gameplay requests as is relied upon in prior art systems. It is understood that the process for determining whether or not to create a new game 600 according to FIG. 6 demonstrates an exemplary embodiment of the disclosure, such that one of ordinary skill in the art will recognize that the disclosure encompasses varying arrangements of process steps, including changes in the order of steps or the combination of any two or more steps, and is not limited to the detailed embodiment.

As illustrated in FIG. 6, the gaming server may be configured to receive a gameplay request 610 and initiate a determination of whether or not to create a new game using the gameplay request. The gaming server may identify a number of active games pending at the gaming server 612 and determine if the number of active games pending at the gaming server meets a predefined condition for a maximum number of active games 614.

In embodiments of the disclosure, an active game may comprise a call as described above, whether or not actively applied to a card from a gameplay request. Accordingly, while a new game may be created with only a predetermined number of concurrent gameplay requests, an active game may be subsequently maintained without gameplay requests, in an empty state, indefinitely. Similarly, an active game may receive or be applied to a single gameplay request or a plurality of concurrent gameplay requests as assigned by the gaming server, until a predetermined ending condition is met and the call of the active game is discarded. New games are therefore created when possible, and active games are essentially stockpiled, whether in an empty state or receiving gameplay requests, to accommodate periods of low player participation.

Where the number of active games pending at the gaming server meets the predefined condition for the maximum number of games, the gaming server determines not to begin a new game and directs that the gameplay request be added to one of the existing games such that the gameplay station corresponding to the gameplay request is connected to an active game and enables a player to participate in the game. According to varying embodiments, the predefined condition for the maximum number of games may be established to balance the creation of new games with the processing requirements of each active game, such as for realizing an advantageous speed of gaming.

In practice, the maximum number of games may be based on a predetermined probability of availability of a game. As previously described, bingo games according to the disclosure may be adapted to facilitate a plurality of winning patterns or arrangements, including a game winning pattern for concluding the game. In embodiments, the game winning pattern may be selected to have a low probability of occurring, such that the game is expected to continue for a predetermined number of cards and/or gameplay requests. A maximum number of bingo games may therefore be selected based on a number of cards and/or gameplay requests considered statistically unlikely to end during regular use of the gaming system 100. For example, the maximum number of games may be at least 2, at least 4, at least 6, at least 8, at least 10, or no more than 20. In one embodiment, the maximum number of games may be 4.

Should the gaming server determine not to begin a new game when evaluating a gameplay request 610, the gameplay request 610 may be assigned to an existing game. The selection of an existing game for the gameplay request 610 may be made randomly or based on prioritized conditions. For example, when assigning a gameplay request 610 to an existing game the gaming server may first assign the gameplay request to any existing game in a waiting for players state (such as a new game created based on an earlier gameplay request that has not met the regulatory requirements for a number of players to start a new game), assign the gameplay request to an existing game based on the usage of each game (such as assigning the gameplay request to the least used existing game), and/or assign the gameplay request to existing games sequentially.

Should the number of active games pending at the gaming server fail to meet the predefined condition for the maximum number of games, the gaming server may identify a number of failed gameplay requests at the gaming server 616 and determine whether the number of failed gameplay requests exceeds a predefined condition for a maximum failure rate 618.

As described previously, class II gaming regulations may require a predetermined number of players for initiating a new game (e.g. at least two). As such, subsequent to a gameplay request being used to create a new game, a player must wait for additional gameplay requests prior to comparison of the player's card to the call of the game. A timer in the gaming server or the gameplay station monitors the game and may fail the gameplay request after the passage of a predetermined period of time without additional gameplay requests being added to the game. In an example, the predetermined period of time for failing the gameplay request may be less than 10 seconds, less than 20 seconds, less than 30 seconds, or approximately 15 seconds, more particularly about 15.5 seconds.

In varying embodiments, the failure of the gameplay request may result in discarding the new game and the associated call, and a new gameplay request must be input by the player or the failed gameplay request is resubmitted to the gaming server for reconsideration.

According to an embodiment, the maximum failure rate may be defined by a number of failed gameplay requests per a predefined period of time. For example, the maximum failure rate may comprise 1 failed gameplay request per second, 1 failed gameplay request per minute, or 2 failed gameplay requests per minute.

Should the number of failed gameplay requests exceed the predefined condition for the maximum failure rate, the gameplay request may then be added to one of the existing games. The use of a predefined condition for a maximum failure rate prevents problematic situations where an insufficient number of players is present, or inappropriately distributed, to facilitate gameplay in existing games or in a new game. Importantly, however, the method for determining whether or not to create a new game of the current disclosure may be configured to err on the side of creating a new game, such that a maximum number of games may be created whenever possible without interrupting gameplay.

Accordingly, where the number of failed gameplay requests is determined to be below the predefined condition for the maximum failure rate 618, the gameplay request may progress towards the creation of a new game by creating a usage value based on a ratio of a number of the plurality of gameplay stations and the number of active games pending at the gaming server 620. The usage value may be based on a weighted number of the plurality of gameplay stations and a weighted number of active games pending at the gaming server, the resulting weighted usage value being between 0 and 100.

The usage value may be compared to a first randomly selected control value 622, such as a random value between 0 and 101, such that if the usage value is less than the first randomly selected control value the gameplay request is added to an existing game and if it is larger than the first randomly selected control value the gameplay request may progress towards the creation of a new game.

The gaming server may identify a number of the plurality of gameplay stations participating in active games pending at the gaming server 624, for determining whether a weighted number of the plurality of gameplay stations participating in active games pending at the gaming server exceeds a second randomly selected control value 626. When the weighted number of the plurality of gameplay stations participating in active games pending at the gaming server is less than the second randomly selected control value the gameplay request may be added to an existing game.

Alternatively, when the number of the plurality of gameplay stations participating in active games pending at the gaming server is larger than the second randomly selected control value, the gameplay request may progress towards the creation of a new game with the gameplay request 628.

As discussed previously, the creation of a new game at the gaming server may include generating a new call, for example based on a randomized selection of tokens from a token pool, for comparison to a card of the gameplay request. The comparison of the card to the call of the new game may be delayed in a "Waiting for Players" state until additional gameplay requests are added to the new game, such as may be required by class II gaming regulations in a given jurisdiction.

Figure 7:
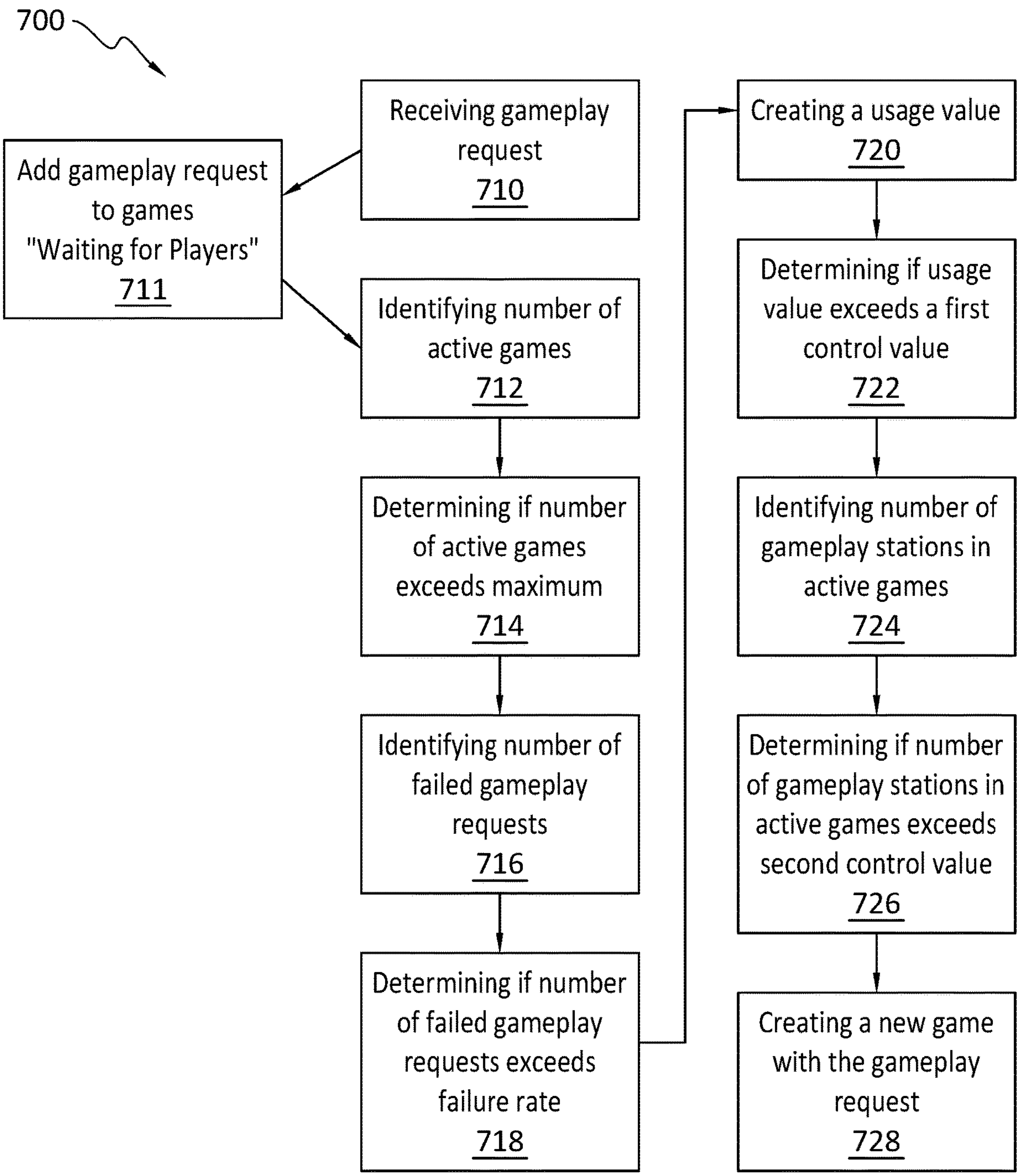
FIG. 7 is a flow diagram of a method for aggregating players and creating games according to another embodiment of the present disclosure.

According to an embodiment, the gaming server may be configured to add subsequent gameplay requests received to any games in the "Waiting for Players" state prior to proceeding 710 according to the method of FIG. 7. The method of FIG. 7 may allow that new games are more successfully completed prior to determining whether or not to create a new game using a subsequent gameplay request.

As provided above, embodiments are considered where the arrangement of the steps illustrated in FIGS. 6 and 7 is modified, with respect to the order of the steps and/or the number of steps included, such that the gaming server may be configured to increase the number of active games pending at the gaming server relative to the number of players and/or gameplay stations, such that a maximum number of games is advantageously maintained at the gaming server even during periods of low player participation.

Figure 8:
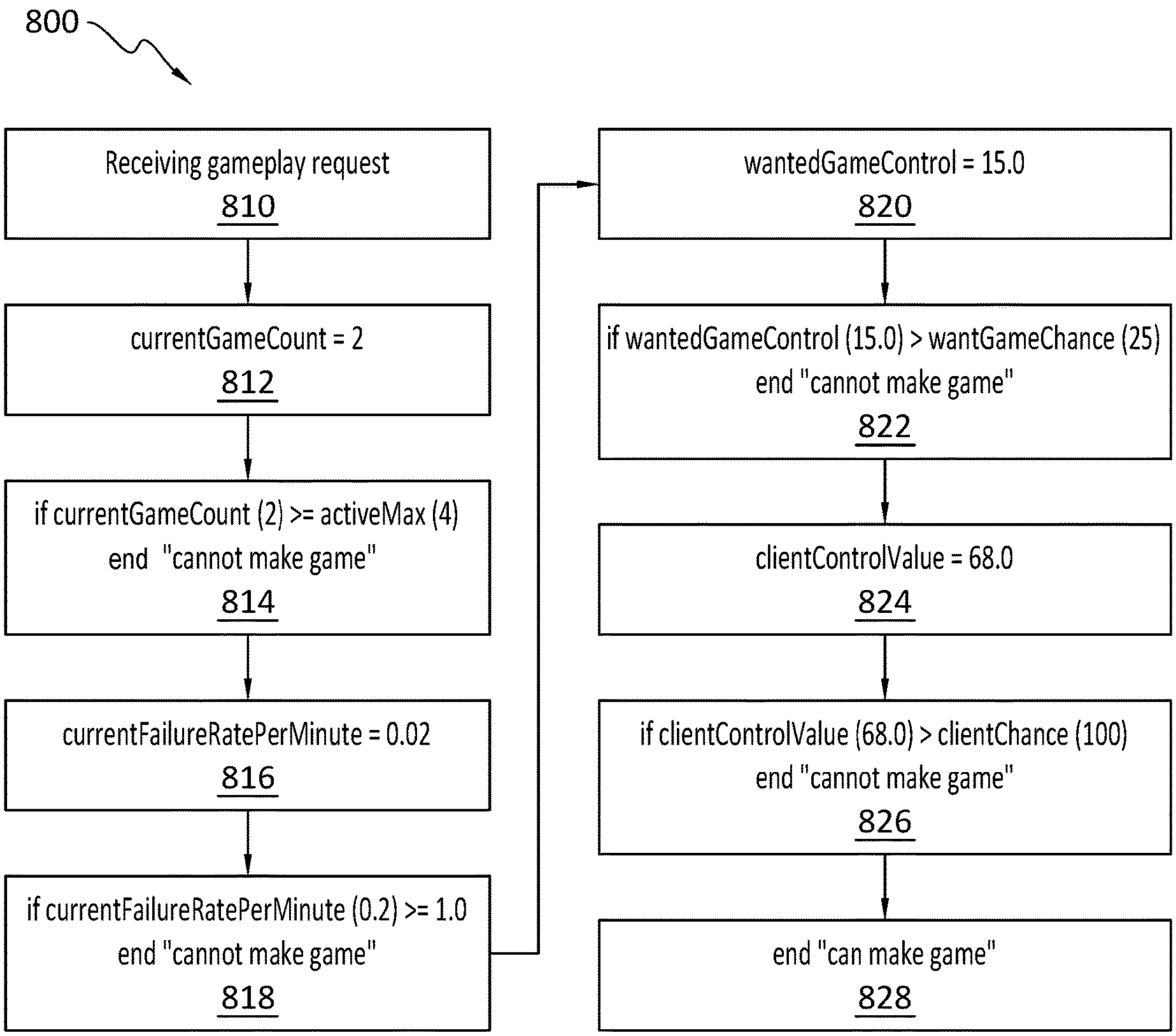
FIG. 8 is a flow diagram of an implementation of a method for aggregating players and creating games according to another embodiment of the present disclosure.

Various features of the disclosure may be better understood by reference to a specific example of a process for determining whether or not to create a new game 800 according to the current disclosure, as illustrated in FIG. 8 and detailed below. The example provided is illustrative in nature of a single application of principles according to the disclosure and is not intended to be limiting.

In the example of FIG. 8, a gameplay request is received 810 and the gaming server evaluates whether or not to begin a new game based on conditions of the gaming system. The gaming server identifies that there are 2 active games pending at the gaming server 812 and proceeds to determine if the number of active games pending at the gaming server meets a maximum number of 4 active games by evaluating: if currentGameCount (2)>=activeMax (4) end "cannot make game". As the current game count of 2 is less than the maximum number of 4 games, the gaming server continues by determining a current failure rate of 0.2 gameplay requests that have failed out of a waiting for players state per minute 814. The current failure rate is compared to a predetermined maximum failure rate of 1 failed gameplay request per minute: if currentFailureRatePerMinute (0.2) >=1.0 end "cannot make game" 818.

A first randomly selected control value between 0 and 101, a wanted game control, is selected 820 and subsequently checked against a usage value or a want to create a game value: if wantedGameControl (15.0)>wantGameChance (25) end "cannot make game" 822. The want to create a game value is defined as a weighted number of registered gameplay stations on the gaming server over a weighted number of current games, clamped between 0 and 101. In the present example, a want game weight=2.0 and a number of registered players=25, such that a weighted number of registered gameplay stations=50 and the number of current games=2, resulting in a want to create a game value of 25.

A second randomly selected control value between 0 and 101, a client control value, is selected 824 and subsequently checked against a client chance value: if clientControlValue (68.0)>clientChance (100) end "cannot make game" 826. The client chance value is defined as a weighted value of the number of registered gameplay stations on the gaming server. For example, in the system of FIG. 8, a client weight=4.0 and a number of registered gameplay stations on the gaming server=25, such that a client chance value=100.

The process 800 may then end with a "can make new game" condition 828, such that the specific example of FIG. 8 results in the creation of a new game. As would be evident to one skilled in the art from the teachings of the disclosure, where conditions of the system vary the process may end in a "cannot make game" state in the conditional steps 814, 818, 822, 826, such that the gameplay request is added to an existing game. Similarly, variations in the parameters selected from the specific example of FIG. 8 are contemplated, as would be understood by one skilled in the art from the present disclosure.

At least in part due to the described evaluation of the conditions of the gaming system according to the current disclosure, particularly the status and number of games pending in the gaming system, rather than the status or number of requests in a queue, the gaming server of the disclosure is able to ensure the creation and concurrent pendency of a greater number of games using a smaller player pool than is possible in the prior art. Instead of basing the creation of a new game on a total number of players waiting to play, the gaming server advantageously evaluates a gameplay request based on pending games in the gaming server.

By providing a gaming system and method for using the same according to the disclosed embodiments, the requirements of existing gaming systems including complex and costly connections of gaming systems across large geographic areas or large facilities are addressed. The gaming system embodiments provided herein advantageously allow a prospective player to play essentially on demand without waiting for additional players, thereby increasing a player's enjoyment of the gaming machine generally, while meeting the regulatory requirements and retaining the advantages of class II gaming.

While the invention has been illustrated and described in detail in the drawings and foregoing description, the same is to be considered as illustrative and not restrictive in character, it being understood that only the preferred embodiments have been shown and described and that all changes, equivalents, and modifications that come within the spirit of the inventions defined by following claims are desired to be protected.

Accordingly, features of the disclosed embodiments may be combined or arranged for achieving particular advantages as would be understood from the disclosure by one of ordinary skill in the art. Similarly, features of the disclosed embodiments may provide independent benefits applicable to other examples not detailed herein. For example, the disclosure is not to be considered restricted to gaming systems free of connections across large geographical areas, as methods of the disclosure are able to ensure the creation and concurrent pendency of a greater number of games using a smaller player pool than is possible in the prior art, reducing processing requirements and increasing the speed of gameplay.

It is to be understood that not necessarily all objects or advantages may be achieved under any embodiment of the disclosure. Those skilled in the art will recognize that the disclosed gaming system and related methods may be embodied or carried out in a manner that achieves or optimizes one advantage or group of advantages as taught without achieving other objects or advantages as taught or suggested.

The skilled artisan will recognize the interchangeability of various disclosed features. Besides the variations described, other known equivalents for various features can be mixed and matched by one of ordinary skill in this art to make or use a gaming system and related methods under principles of the present disclosure. It will be understood by the skilled artisan that the features described may be adapted to other types of systems, games and regulatory requirements.

Although this disclosure describes certain exemplary embodiments and examples of a gaming system and related methods, it will be understood by those skilled in the art that the present disclosure extends beyond the specifically disclosed embodiments to other alternative embodiments and/or uses of the disclosure and obvious modifications and equivalents thereof. It is intended that the present disclosure should not be limited by the particular disclosed embodiments described above.

The invention claimed is:

1. A gaming system comprising:

a gaming server in communication with a plurality of gameplay stations, the gaming server comprising a memory and a processor configured for executing instructions stored on the memory to perform the following steps:

receive a gameplay request from one of the plurality of gameplay stations;

identify a number of active games pending at the gaming server;

determine whether the number of active games meets a predefined condition for a maximum number of active games;

identify a number of failed gameplay requests at the gaming server;

determine whether the number of failed gameplay requests exceeds a predefined condition for a maximum failure rate;

create a new game based on the gameplay request from said one of the plurality of gameplay stations in response to determining that the number of active games meets the predefined condition for the maximum number of active games and the number of failed gameplay requests does not exceed the predefined condition for the maximum failure rate.

2. The gaming system of claim 1, wherein the plurality of gameplay stations and the gaming server are in network communication.

3. The gaming system of claim 1, wherein the plurality of gameplay stations and the gaming server are in network communication via a local connection.

4. The gaming system of claim 1, wherein the gaming server is configured to be in communication with at least four gameplay stations.

5. The gaming system of claim 1, wherein the gaming system comprises said plurality of gameplay stations.

6. The gaming system of claim 1, wherein each of the plurality of gameplay stations comprises a display and a wager interface.

7. The gaming system of claim 1, wherein the processor further creates a usage value based on a ratio of a number of the plurality of gameplay stations and the number of active games in response to determining that the number of failed game play requests at the gaming server is below the predefined condition for the maximum failure rate.

8. The gaming system of claim 1, wherein the processor further identifies a number of the plurality of gameplay stations currently participating in the active games pending at the gaming server.

9. The gaming system of claim 8, wherein the processor further determines whether the number of the plurality of gameplay stations currently participating in the active games pending at the gaming server exceeds a randomly selected control value.

10. The gaming system of claim 1, wherein the new game created is a bingo game.

11. A method for aggregating players and creating games in a gaming system comprising a plurality of gameplay stations and a gaming server including at least a memory and a processor, the method comprising:

receiving a gameplay request from one of the plurality of gameplay stations;

identifying a number of active games pending at the gaming server;

determining whether the number of active games meets a predefined condition for a maximum number of active games;

identifying a number of failed gameplay requests at the gaming server;

determining whether the number of failed gameplay requests exceeds a predefined condition for a maximum failure rate;

creating a new game based on the gameplay request from said one of the plurality of gameplay stations in response to determining that the number of active games meets the predefined condition for the maximum number of active games and the number of failed gameplay requests does not exceed the predefined condition for the maximum failure rate.

12. The method of claim 11, wherein the plurality of gameplay stations and the gaming server are in network communication.

13. The method of claim 11, wherein the plurality of gameplay stations and the gaming server are in network communication via a local connection.

14. The method of claim 11, wherein the gaming server is in communication with at least four gameplay stations.

15. The method of claim 11, wherein each of the plurality of gameplay stations comprises a display and a wager interface.

16. The method of claim 11, further comprising the gaming server creating a usage value based on a ratio of a number of the plurality of gameplay stations and the number of active games in response to determining that the number of failed game play requests at the gaming server is below the predefined condition for the maximum failure rate.

17. The method of claim 11, further comprising the gaming server identifying a number of the plurality of gameplay stations currently participating in the active games pending at the gaming server.

18. The method of claim 17, further comprising the gaming server determining whether the number of the plurality of gameplay stations currently participating in the active games pending at the gaming server exceeds a randomly selected control value.

19. The gaming system of claim 11, wherein the new game created is a bingo game.

20. One or more non-transitory computer-readable media having stored thereon executable instructions that when executed by the one or more processors configure a gaming server to perform at least the following:

receive a gameplay request from one of the plurality of gameplay stations;

identify a number of active games pending at the gaming server;

determine whether the number of active games meets a predefined condition for a maximum number of active games;

identify a number of failed gameplay requests at the gaming server;

determine whether the number of failed gameplay requests exceeds a predefined condition for a maximum failure rate;

create a new game based on the gameplay request from said one of the plurality of gameplay stations in response to determining that the number of active games meets the predefined condition for the maximum number of active games and the number of failed gameplay requests does not exceed the predefined condition for the maximum failure rate.

* * * * *